(12) United States Patent
Lin

(10) Patent No.: US 10,803,355 B2
(45) Date of Patent: Oct. 13, 2020

(54) METHOD FOR TRAINING IMAGE GENERATOR

(71) Applicant: INDUSTRIAL TECHNOLOGY RESEARCH INSTITUTE, Hsinchu (TW)

(72) Inventor: Che-Tsung Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 162 days.

(21) Appl. No.: 16/231,669

(22) Filed: Dec. 24, 2018

(65) Prior Publication Data
US 2020/0202174 A1    Jun. 25, 2020

(30) Foreign Application Priority Data

Dec. 19, 2018   (TW) .............................. 107145971 A

(51) Int. Cl.
G06K 9/62       (2006.01)
G06N 20/00     (2019.01)
G06K 9/00       (2006.01)

(52) U.S. Cl.
CPC .......... *G06K 9/6257* (2013.01); *G06K 9/6215* (2013.01); *G06K 9/6262* (2013.01); *G06N 20/00* (2019.01); *G06K 9/00798* (2013.01)

(58) Field of Classification Search
CPC .. G06K 9/6257; G06K 9/6262; G06K 9/6215; G06K 9/00798; G06N 20/00
(Continued)

(56) References Cited

U.S. PATENT DOCUMENTS 8,687,063 B2    4/2014   Hsieh et al.
8,903,638 B2   12/2014   Lin et al.
(Continued)

FOREIGN PATENT DOCUMENTS

CN    106650814 A    5/2017
CN    107123151 A    9/2017
(Continued)

OTHER PUBLICATIONS

Translation of TW107145971 Search Report (Year: 2018).*
Goodfellow et al., "Generative Adversarial Nets", Jun. 10, 2014, pp. 1-9.
Gurghian et al., "DeepLanes: End-To-End Lane Position Estimation using Deep Neural Networks", 2016 IEEE Conference on Computer Vision and Pattern Recognition Workshops, pp. 38-45.
(Continued)

*Primary Examiner* — Amandeep Saini
(74) *Attorney, Agent, or Firm* — Birch, Stewart, Kolasch & Birch, LLP

(57) ABSTRACT

A method for training an image generator includes multiple iterations, each including: inputting a real image the a first generator; generating a generated image by an image transformation branch of the first generator; inputting the generated image to a discriminator; obtaining a loss value from the discriminator; generating a segmented image by an image segmentation branch of the first generator; obtaining a segmentation loss value according to the segmented image; inputting the generated image to a second generator; generating a reconstructed image by the second generator; and obtaining a reconstruction loss value according to the reconstructed and the real images. Difference in network weights of the image transformation and segmentation branches is compared to obtain a similarity loss value. Network parameters of the first and the second generators are updated according to the loss value, the segmentation loss value, the reconstruction loss value and the similarity loss value.

10 Claims, 11 Drawing Sheets

(58) Field of Classification Search
USPC .......................................................... 382/159
See application file for complete search history.

(56) References Cited

U.S. PATENT DOCUMENTS

| | | | |
|---|---|---|---|
| 9,996,772 B2 | 6/2018 | Ahmed et al. | |
| 2011/0007964 A1 | 1/2011 | Saund et al. | |
| 2013/0208945 A1* | 8/2013 | Nunn ................. | G06K 9/00798 382/103 |
| 2017/0369057 A1 | 12/2017 | Gurghian et al. | |
| 2018/0045516 A1 | 2/2018 | Sumizawa | |
| 2018/0253866 A1* | 9/2018 | Jain ....................... | G06N 7/005 |

FOREIGN PATENT DOCUMENTS

| | | |
|---|---|---|
| CN | 107464210 A | 12/2017 |
| CN | 107481188 A | 12/2017 |
| TW | 201441849 A | 11/2014 |

OTHER PUBLICATIONS

Huang et al., "AugGAN: Cross Domain Adaptation with GAN-based Data Augmentation", CVF, 2018, pp. 1-14.
Isola et al., "Image-to-Image Translation with Conditional Adversarial Networks", CVF, Nov. 26, 2018, pp. 1125-1134.
Liu et al., "Coupled Generative Adversarial Networks", 29th Conference on Neural Information Processing Systems (NIPS 2016), Barcelona, Spain, Sep. 20, 2016, pp. 1-32.
Liu et al., "Unsupervised Image-to-Image Translation Networks", 31st Conference on Neural Information Processing Systems (NIPS 2017), Long Beach, CA, pp. 1-9.
Zhu et al., "Toward Multimodal Image-to-Image Translation", 31st Conference on Neural Information Processing Systems (NIPS 2017), Long Beach, CA, pp. 1-12.
Zhu et al., "Unpaired Image-to-Image Translation using Cycle-Consistent Adversarial Networks", Nov. 15, 2018, total 18 pages.

* cited by examiner

METHOD FOR TRAINING IMAGE GENERATOR

This application claims the benefit of Taiwan application Serial No. 107145971, filed Dec. 19, 2018, the disclosure of which is incorporated by reference herein in its entirety.

TECHNICAL FIELD

The disclosure relates in general to a method for training an image generator, and more particularly to a method for training an image generator based on adversarial training technique.

BACKGROUND

In recent years, due to the rise of artificial intelligence technology, the work that needed to be done manually can be completed by machines, and thus greatly reducing labor costs.

However, in order to replace labor works with machine, a large number of learning data are needed so as to increase the accuracy in real use. For example, if the machine is applied to image recognition for road detection, a large number of target labelling data (such as line marking labelling data) is required to train the deep learning model. Nevertheless, it is hard to obtain such a large number of target labeling data, making the deep learning model not good in performance.

SUMMARY

The disclosure is directed to a method for training an image generator which can improve the above problems.

According to one embodiment, a method for training an image generator is provided. The trained image generator may be used to augment images having target labels. The method includes the following steps. A plurality of first iterations are performed. Each of the first iterations performs the following steps: inputting a first real image having a first road surface feature to a first generator; performing, by a first image transformation branch of the first generator, a first image transformation process on the first real image to generate a first generated image and transform the first road surface feature to a second road surface feature; inputting the first generated image to a first discriminator; obtaining, from the first discriminator, a first loss value according to the first generated image; performing, by a first image segmentation branch of the first generator, a first image segmentation process on the first real image to generate a first segmented image; obtaining a first segmentation loss value according to the first segmented image; inputting the first generated image to a second generator; performing, by the second generator, a second image transformation process on the first generated image to generate a first reconstructed image and transform the second road surface feature to the first road surface feature; and obtaining a first reconstruction loss value according to the first reconstructed image and the first real image. Difference in network weights of the first image transformation branch and the first image segmentation branch is compared to obtain a first similarity loss value. Network parameters of the first generator and the second generator are updated according to the first loss value, the first segmentation loss value, the first reconstruction loss value and the first similarity loss value obtained in each of the first iterations to complete the training of the image generator.

The above and other aspects of this disclosure will become better understood with regard to the following detailed description of the preferred but non-limiting embodiments. The following description is made with reference to the accompanying drawings.

DETAILED DESCRIPTION

The present disclosure provides a method for training an image generator. The trained image generator may be used to augment training images for the deep learning model to learn. Thus, the deep learning model can be applied to image recognition for road detection.

A large number of target labeling data is usually required in such training images to improve the performance of the deep learning model. For example, one type of the target label is the label of road line marking, and the line marking, for example, may be lane line, stop line, roadside line and so on. Learning a plurality of training images having target labels (such as labels of line marking) may facilitate high-precision lane line detection for the deep learning model. Besides, more training images may be used to further enhance the performance of the deep learning model.

According to the embodiments of the present disclosure, an image generator for augmenting training images may be trained based on adversarial training technique. Through the trained image generator, when an initial training image having a target label is input to the image generator, the image generator may generate another training image having another type of road surface feature (such as pavement materials, type of lane line and other road surface features) under the same scene. This generated training image also has a target label, the position of which corresponds to that of the input initial training image. The so-called "the position . . . corresponds to . . . " or other similar wordings used herein may generally indicate that the pixels classified as the category of "the target label" between two training images are pixels at the same position.

Briefly, through the trained image generator, the position of the target label in the generated training image may remain unchanged. That is, the position of the target label in the generated training image corresponds to that in the initial training image. Thus, a plurality of training images having different road surface features under the same scene can be obtained, and the positions of the target labels among these training images remain unchanged, so that it is not necessary to re-label the targets again. Thereby, multiplying the quantity of the training images having different road surface features under the same scene may be achieved.

Figure 1:
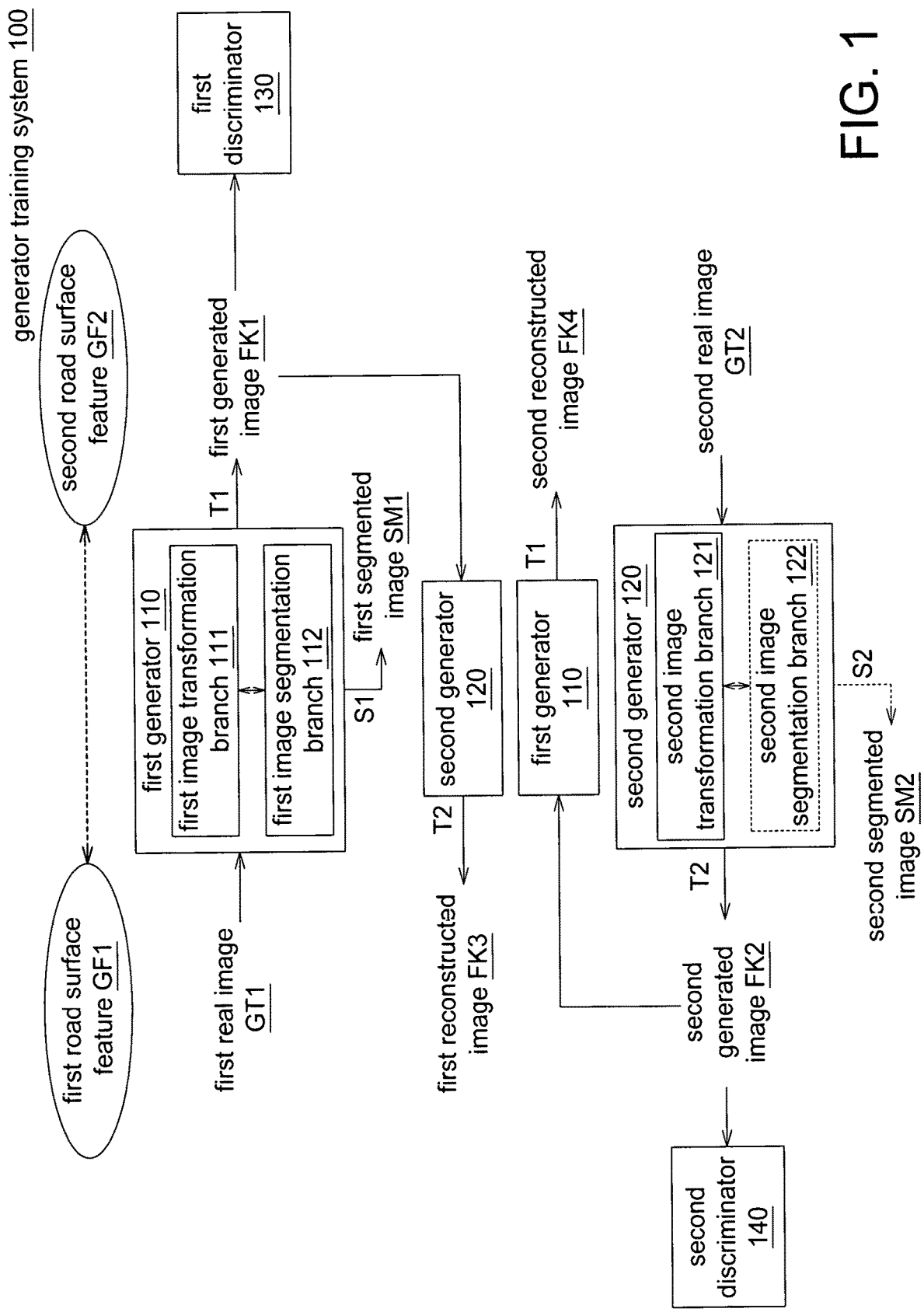
FIG. 1 is a blocking diagram of a generator training system according to the embodiments of the present disclosure.

FIG. 1 is a blocking diagram of a generator training system 100 according to the embodiments of the present disclosure. In one embodiment, the generator training system 100 may include a training system of a first generator 110, as shown in the upper portion of FIG. 1. The training system of the first generator 110 includes a first generator 110, a second generator 120 and a first discriminator 130. At least one of the first generator 110, the second generator 120 and the first discriminator 130 may be integrated into a process, such as a CPU. For example, at least one of the first generator 110, the second generator 120 and the first discriminator 130 may be a software, a firmware or a circuit architecture.

The first generator 110 may be used to generate another image having a second road surface feature GF2 from an image having a first road surface feature GF1. Inversely, the second generator 120 may be used to generate another image having the first road surface feature GF1 from an image having the second road surface feature GF2.

In some embodiments, the first road surface feature GF1 and the second road surface feature GF2 may be different from each other in types of pavement materials, such as asphalt pavement, cement pavement and any pavement material that can be drawn with line markings. For example, the first road surface feature GF1 may be the asphalt pavement, and the second road surface feature GF2 may be the cement pavement. In other embodiments, the first road surface feature GF1 and the second road surface feature GF2 may be road surfaces each having different features under different weather or time-of-day, or a combination thereof, such as the road surfaces having different features under daytime, nighttime, sunny, rainy, fog and a combination thereof. For example, the first road surface feature GF1 may be the asphalt pavement in the morning, and the second road surface feature GF2 may be the cement pavement in the evening. In still other embodiments, the first road surface feature GF1 and the second road surface feature GF2 may be different from each other in types of line markings, such as lane lines (e.g., double solid yellow line, single solid yellow line, single dashed yellow line, double solid white line, single dashed white line, single solid red line and so on). For example, the first road surface feature GF1 may be double solid yellow line, and the second road surface feature GF2 may be single dashed yellow line. The above embodiments are merely used for illustrative purposes, and it can be understood that the present disclosure is not limited to the above embodiments.

After the training of the first generator 110 is completed, an initial training image having a target label and a first road surface feature GF1 may be input to the first generator 110. The first generator 110 may transform the first road surface feature GF1 of the initial training image to a second road surface feature GF2, and generate another training image. The generated training image also has a target label, the position of which corresponds to that of the input initial training image. The training method of the first generator 110 is further described below first.

Figure 2:
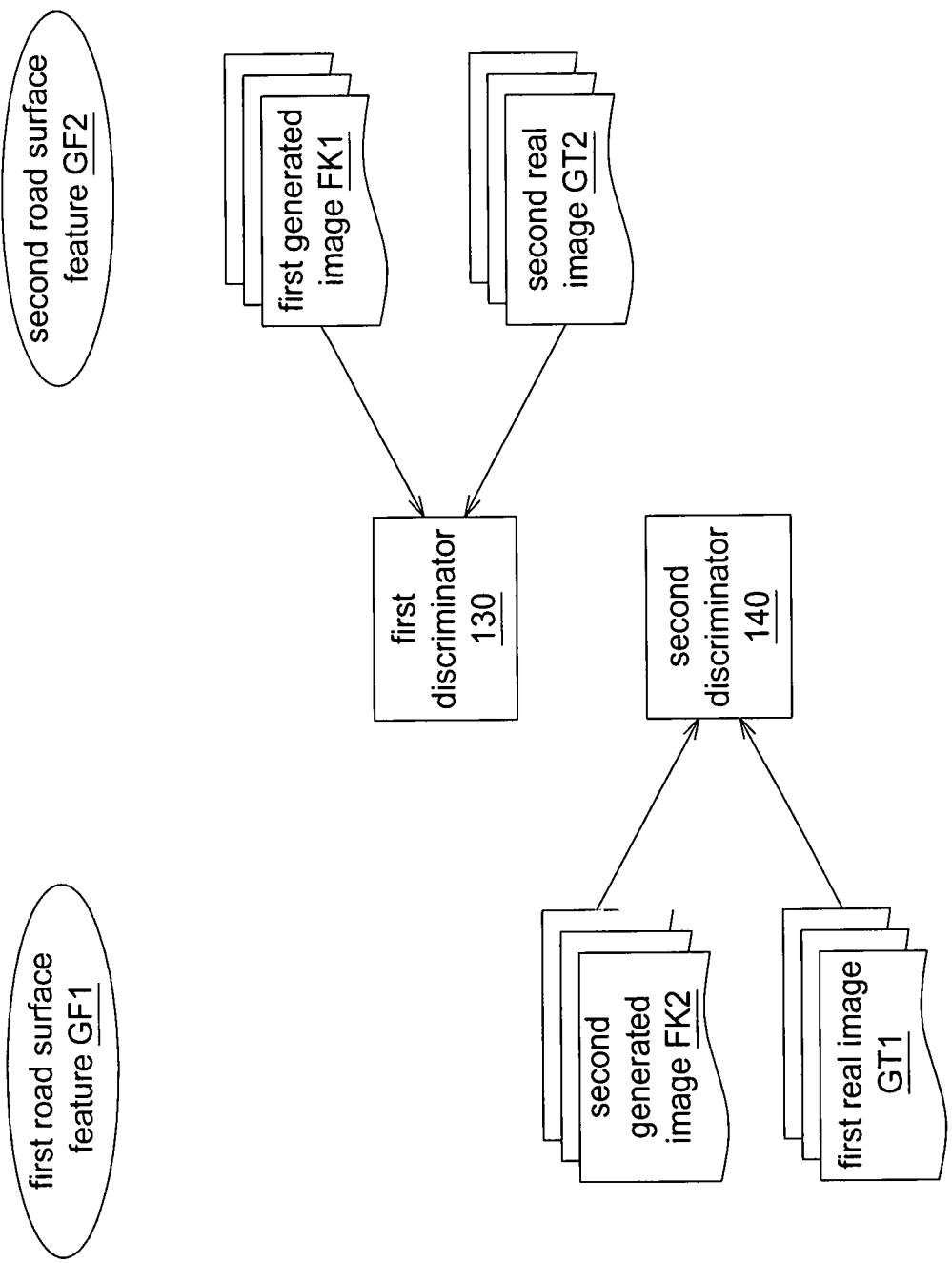
FIG. 2 is a blocking diagram of a discriminator training system according to the embodiments of the present disclosure.
Figure 3:
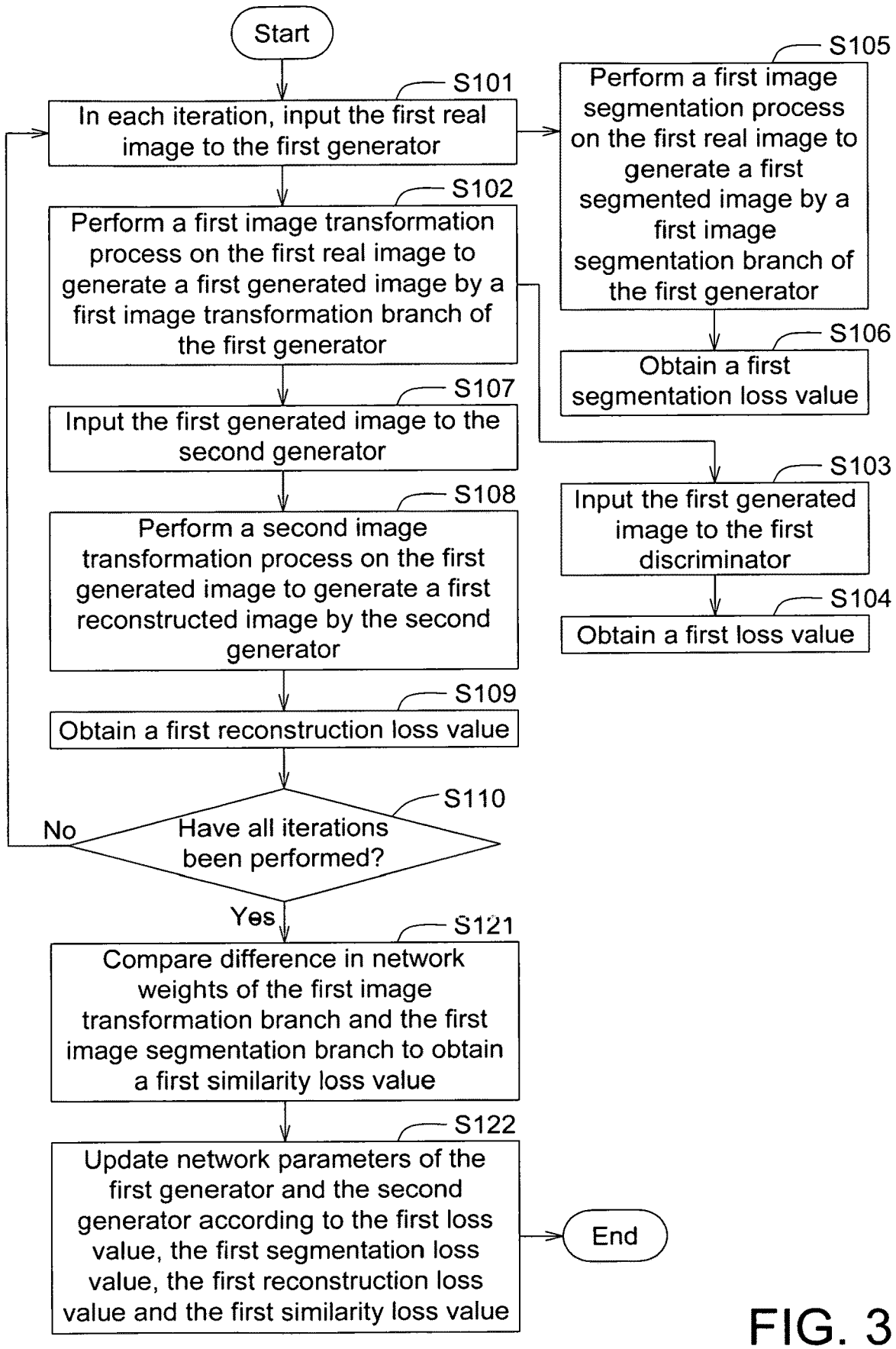
FIG. 3 is a flow chart of a method for training an image generator according to one embodiment of the present disclosure.
Figure 4A:
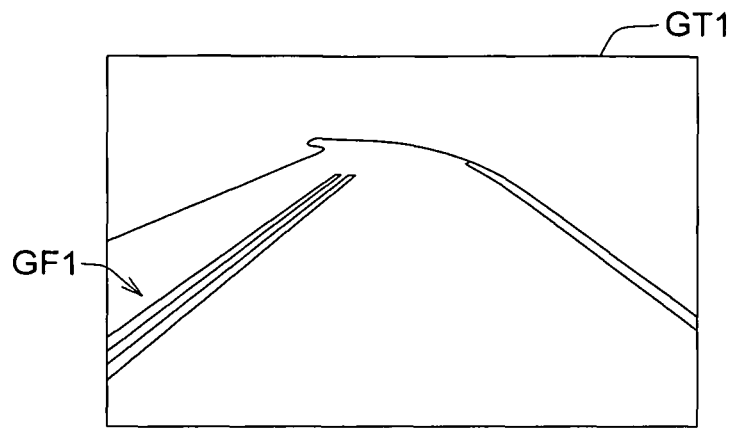
FIG. 4A is a schematic diagram of a first real image according to one embodiment of the present disclosure.
Figure 4B:
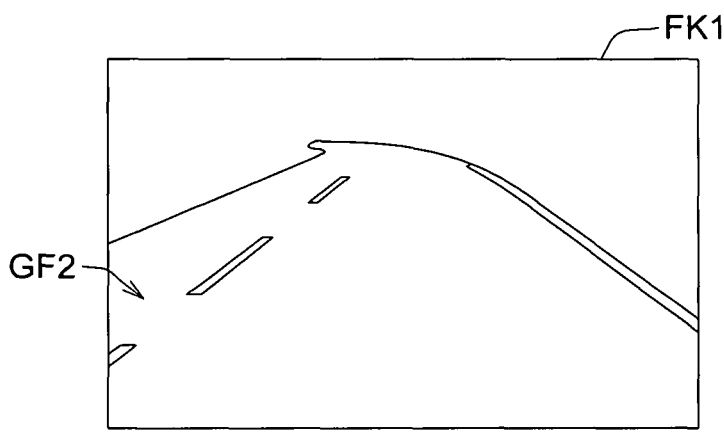
FIG. 4B is a schematic diagram of a first generated image according to one embodiment of the present disclosure.
Figure 4C:
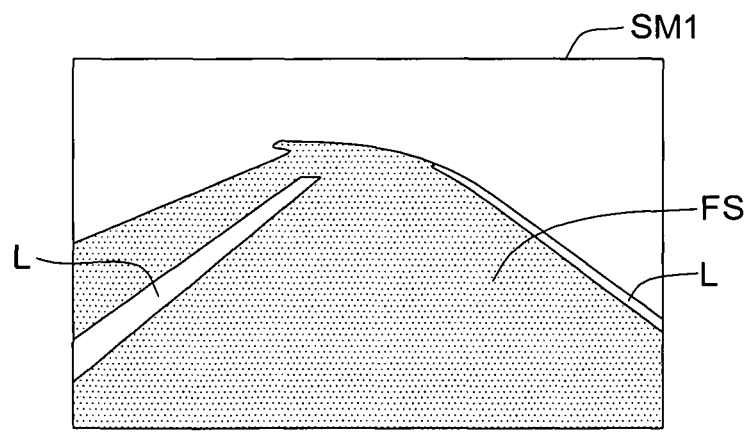
FIG. 4C is a schematic diagram of a first segmented image according to one embodiment of the present disclosure.

FIG. 2 is a blocking diagram of a discriminator training system 200 according to the embodiments of the present disclosure. FIG. 3 is a flow chart of a method for training an image generator according to one embodiment of the present disclosure. FIG. 4A is a schematic diagram of a first real image GT1 according to one embodiment of the present disclosure. FIG. 4B is a schematic diagram of a first generated image FK1 according to one embodiment of the present disclosure. FIG. 4C is a schematic diagram of a first segmented image SM1 according to one embodiment of the present disclosure.

Refer to FIG. 3 further with a reference to FIG. 1 and FIG. 4A. During the training of the first generator 110, multiple iterations are performed. The number of the iterations (the number of the processed images) may depend on the memory size of the processor, and is not particularly limited herein. Steps S101-S109 are repeated for each iteration until the preset iterations are completed. A first loss value (step S104), a first segmentation loss value (step S106) and a first reconstruction loss value (step S109) are obtained in each iteration.

Firstly, as shown in step S101, in each iteration, the first real image GT1 is input to the first generator 110. Herein, the first real image GT1 is an image actually taken on the road, and may be taken by an image sensor (for example, a driving recorder) placed on the vehicle. The first real image GT1 has a first road surface feature GF1. Moreover, in different iterations, different first real images GT1 may be input, but these first real images GT1 all have the first road surface feature GF1. In the present embodiment, as shown in FIG. 4A, the double solid yellow line is exemplified as the first road surface feature GF1.

Refer to FIG. 3 further with a reference to FIG. 1 and FIG. 4B. In step S102, a first image transformation process T1 to the first real image GT1 is performed by a first image transformation branch 111 of the first generator 110 to generate a first generated image FK1 and transform the first road surface feature GF1 to a second road surface feature GF2. In the present embodiment, as shown in FIG. 4B, the single dashed yellow line is exemplified as the second road surface feature GF2.

In step S103, the first generated image FK1 is input to the first discriminator 130. Afterwards, in step S104, a first loss value is obtained according to the first generated image FK1 from the first discriminator 130.

In one embodiment, the first loss value may be expressed as a function, as shown in function (1):

$$\mathcal{L}_{GAN}(G_{x,t}, D_Y, X, Y) = \mathbb{E}_{y\sim Pdata(y)}[\log D_Y(y)] + \mathbb{E}_{x\sim Pdata(x)}[\log(1-D_Y(G_{x,t}(x)))] \qquad (1)$$

In function (1), X and Y respectively denote the image (the first real image GT1) having the first road surface feature GF1 (double solid yellow line) and the image (the generated image FK1) having the second road surface feature GF2 (single dashed yellow line). $G_{x,t}$ denotes the first image transformation branch 111 of the first generator 110 which is in charge of performing the first image transformation process T1 to the image x (the first real image GT1). $D_y$ denotes the first discriminator 130.

It should be noted that the training of the first discriminator 130 is also performed interactively during the multiple iterations of the training of the first generator 110. As shown in the upper portion of the discriminator training system 200 in FIG. 2, the first generated image FK1 and a second real image GT2 are input to the first discriminator 130. The first generated image FK1 and the second real image GT2 both have the second road surface feature GF2 (single dashed yellow line); the difference is in that the first generated image FK1 is an image generated from the first generator 110, while the second real image GT2 is an image actually taken on the road. The training of the first discriminator 130 aims at determining whether there is a difference between the first generated image FK1 having the single dashed yellow line and the second real image GT2 having a real single dashed yellow line. If the input image is the second real image GT2, it is desired that the first discriminator 130 outputs a result (i.e., $D_y$) close to 1. If the input image is the first generated image FK1, it is desired that the first discriminator 130 outputs a result (i.e., $D_Y(G_{x,t}(x))$) close to 0. Therefore, for the training of the first discriminator 130, it is desired to maximize the function (1).

Inversely, for the first image transformation branch 111 of the first generator 110, it is desired that the first discriminator 130 outputs a result (i.e., $D_Y(G_{x,t}(x))$) close to 1. Therefore, for the first image transformation branch 111 of the first generator 110, after multiple iterations, it is desired that the latter portion of the function (1) has a value as small as possible. The first image transformation branch 111 of the first generator 110 and the first discriminator 130 oppose each other, and the desired optimization goal is $$\min_{G_t} \max_{D_{Y_t}} \mathcal{L}_{GAN}(G_{x,t}, D_Y, X, Y).$$

Furthermore, in step S104, the first loss value may be obtained from the first discriminator 130 according to the function (1) through comparing the difference between the first generated image FK1 and the second real image GT2. After multiple iterations, multiple first loss values may be obtained.

Finally, $$\min_{G_t} \max_{D_{Y_t}} \mathcal{L}_{GAN}(G_{x,t}, D_Y, X, Y)$$

will be the optimization goal to update the network parameter of the first generator 110 (step S122).

Refer to FIG. 3 further with a reference to FIG. 1 and FIG. 4C. In step S105, a first image segmentation process S1 is performed on the first real image GT1 by a first image segmentation branch 112 of the first generator 110 to generate a first segmented image SM1.

Afterwards, in step S106, a first segmentation loss value is obtained according to the first segmented image SM1.

In one embodiment, the first segmentation loss value may be expressed as a function, as shown in function (2):

$$\mathcal{L}_{seg-x}(G_{x,s}, X, Y_s) = \mathbb{E}_{x \sim Pdata}(x)[\|G_{x,s}(x) - y_s\|_1] \quad (2)$$

In function (2), $G_{x,s}$ denotes the first image segmentation branch 112 of the first generator 110 which is in charge of performing the first image segmentation process S1 on the image x (the first real image GT1). $Y_s$ denotes the ground truth of image segmentation for the first real image GT1.

Furthermore, in step S106, the first segmentation loss value may be obtained by comparing the first segmented image SM1 with the ground truth of image segmentation for the first real image GT1. That is, the first segmentation loss value may represent the difference between the first segmented image SM1 and the ground truth of image segmentation for the first real image GT1. If the image is segmented better and better by the first image segmentation branch 112 of the first generator 110, the loss value will become smaller and smaller. For example, as shown in FIG. 4C, assuming that the first image segmentation branch 112 is an ideal model, after the first image segmentation process S1, the first segmented image SM1 may be divided into the line marking L and the drivable area FS. After multiple iterations, multiple first segmentation loss values may be obtained. Finally, minimizing the first segmentation loss value will be the goal to update the network parameter of the first generator 110 (step S122).

Refer to FIG. 3 further with a reference to FIG. 1 and FIG. 4B. In step S107, the first generated image FK1 is input to the second generator 120.

Then, in step S108, a second image transformation process T2 is performed on the first generated image FK1 by the second generator 120 to generate a first reconstructed image FK3 and transform the second road surface feature GF2 to the first road surface feature GF1.

Afterwards, in step S109, a first reconstruction loss value is obtained according to the first reconstructed image FK3 and the first real image GT1.

In one embodiment, the first reconstruction loss value may be expressed as a function, as shown in function (3):

$$\mathcal{L}_{cyc}(G_{x,t}, G_{y,t}, X) = \mathbb{E}_{x \sim Pdata}(x)[\|G_{y,t}(G_{x,t}(x)) - x\|_1] \quad (3)$$

In function (3), $G_{y,t}$ denotes a part of the second generator 120 which is in charge of performing the second image transformation process T2 on the image y (an image having the second road surface feature GF2, i.e., the first generated image FK1 herein).

Furthermore, in step S109, the first reconstruction loss value may be obtained by comparing the first reconstructed image FK3 with the first real image GT1. That is, the first reconstruction loss value may represent a comparison result between the first reconstructed image FK3 and the first real image GT1. If the difference between the first reconstructed image FK3 (i.e., $G_{y,t}(G_{x,t}(x))$) and the first real image GT1 is very little, the difference between the generated first generated images FK1 and the first real image GT1 may be bounded. After multiple iterations, multiple first reconstruction loss values may be obtained. Finally, minimizing the first reconstruction loss value will be the goal to update the network parameters of the first generator 110 and the second generator 120 (step S122).

Referring to FIG. 3, next, it is determined if all iterations have been performed, as shown in step S110. If not, steps S101-S109 are repeated. If all iterations have been performed, step S121 is performed.

In step S121, difference in network weights of the first image transformation branch 111 and the first image segmentation branch 112 is compared to obtain a first similarity loss value.

In one embodiment, the first similarity loss value may be expressed as a function, as shown in function (4):

$$\mathcal{L}_{\omega-sharing}(\omega_{x,t}, \omega_{x,s}) = -\log(\omega_{x,t} \cdot \omega_{x,s} / \|\omega_{x,t}\|_2 \|\omega_{x,s}\|_2) \quad (4)$$

In function (4), $\omega_{x,t}$ is a network weight vector of the first image transformation branch 111 of the first generator 110, and $\omega_{x,s}$ is a network weight vector of the first image segmentation branch 112 of the first generator 110.

Furthermore, in step S121, the similarity between the first image transformation branch 111 and the first image segmentation branch 112 may be obtained by comparing the difference in network weights of the first image transformation branch 111 of the first generator 110 and the first image segmentation branch 112 of the first generator 110. The so-called "similarity" may refer to the cosine similarity of the weight vectors of the two branches. If the two weight vectors $\omega_{x,t}$ and $\omega_{x,s}$ can be very similar (that is, the angle between the two weight vectors is small so that the network weights of the two branches are as consistent as possible), the loss value can be smaller.

Thereby, the first image segmentation branch 112 may lead the first image transformation branch 111 to maintain the target structure in the image as much as possible during the first image transformation process T1. The present disclosure aims at keeping the positions of the target labels in the image unchanged, so that the positions of the target labels in the generated training image may correspond to those in the initial training image.

Next, in step S122, network parameters of the first generator 110 and the second generator 120 are updated according to the first loss values (step S104), the first segmentation loss values (step S106), the first reconstruction loss values (step S109) and the first similarity loss values (step S121) obtained in all of the iterations, and then the training of the image generator is completed for one time. In other embodiments, the steps as shown in FIG. 3 may be performed for many times (for example, thousands or tens of thousand times) to complete the training of the image generator. Thus, the first image transformation branch 111 of the first generator 110 may be used as an image generator. The first image transformation branch 111 is adapted to generate another training image having the second road surface feature GF2 from an initial training image having the first road surface feature GF1. Moreover, the positions of the target labels in the two training images before and after the transformation correspond to each other.

Figure 5A:
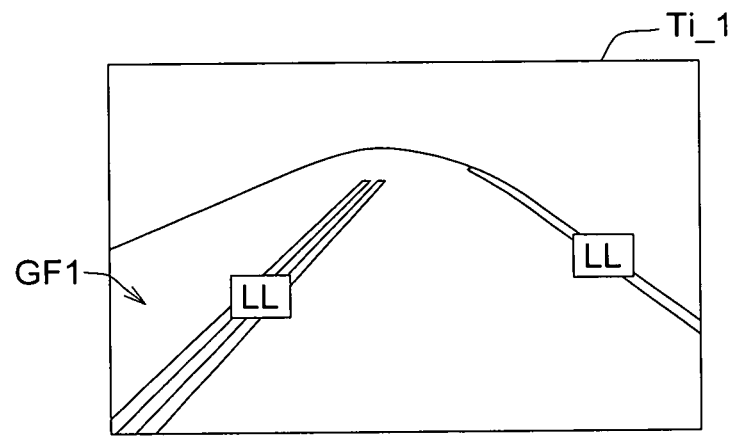
FIG. 5A and FIG. 5B are respectively a schematic diagram of an initial training image and a schematic diagram of a generated training image according to one embodiment of the present disclosure.
Figure 5B:
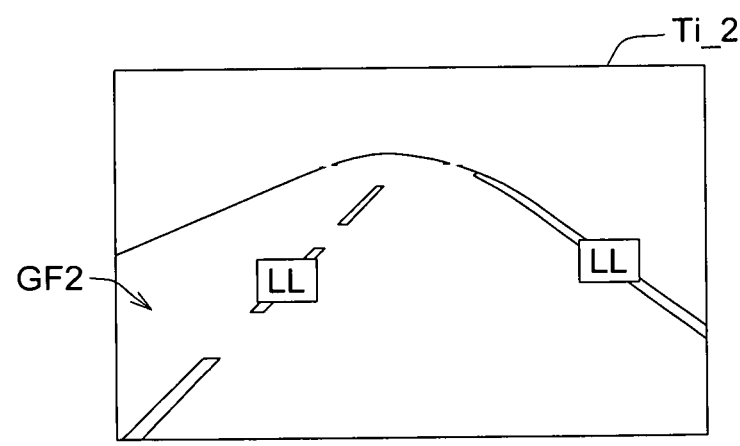

For example, referring to FIG. 5A and FIG. 5B, after the training of the first generator 110 as recited above, an initial training image Ti_1 may be input to the first generator 110. The initial training image Ti_1 has target labels (e.g., labels of the line marking LL) and the first road surface feature GF1 (e.g., double solid yellow line). The first image transformation branch 111 of the first generator 110 may transform the first road surface feature GF1 of the initial training image Ti_1 to the second road surface feature GF2 (e.g. single dashed yellow line) and generate a generated training image Ti_2. Since the network weights of the trained first image transformation branch 111 and the trained first image segmentation branch 112 are similar enough, the first image transformation branch 111 may be affected by the first image segmentation branch 112 during the first image transformation process T1 performed on the initial training image Ti_1. Thus, the positions of the labels of line marking LL in the generated training image Ti_2 may correspond to those in the initial training image Ti_1, and the positions of labels of line marking LL may be unchanged before and after the image transformation.

Referring to FIG. 1, in another embodiment, the generator training system 100 includes the training system of the first generator 110 and further includes a training system of the second generator 120. The training system of the second generator 120 includes the second generator 120, the first generator 110 and a second discriminator 140. At least one of the second generator 120, the first generator 110 and the second discriminator 140 may be integrated into a process, such as a CPU. For example, at least one of the second generator 120, the first generator 110 and the second discriminator 140 may be a software, a firmware or a circuit architecture. Herein, the second generator 120 includes a second image transformation branch 121.

Figure 6A:
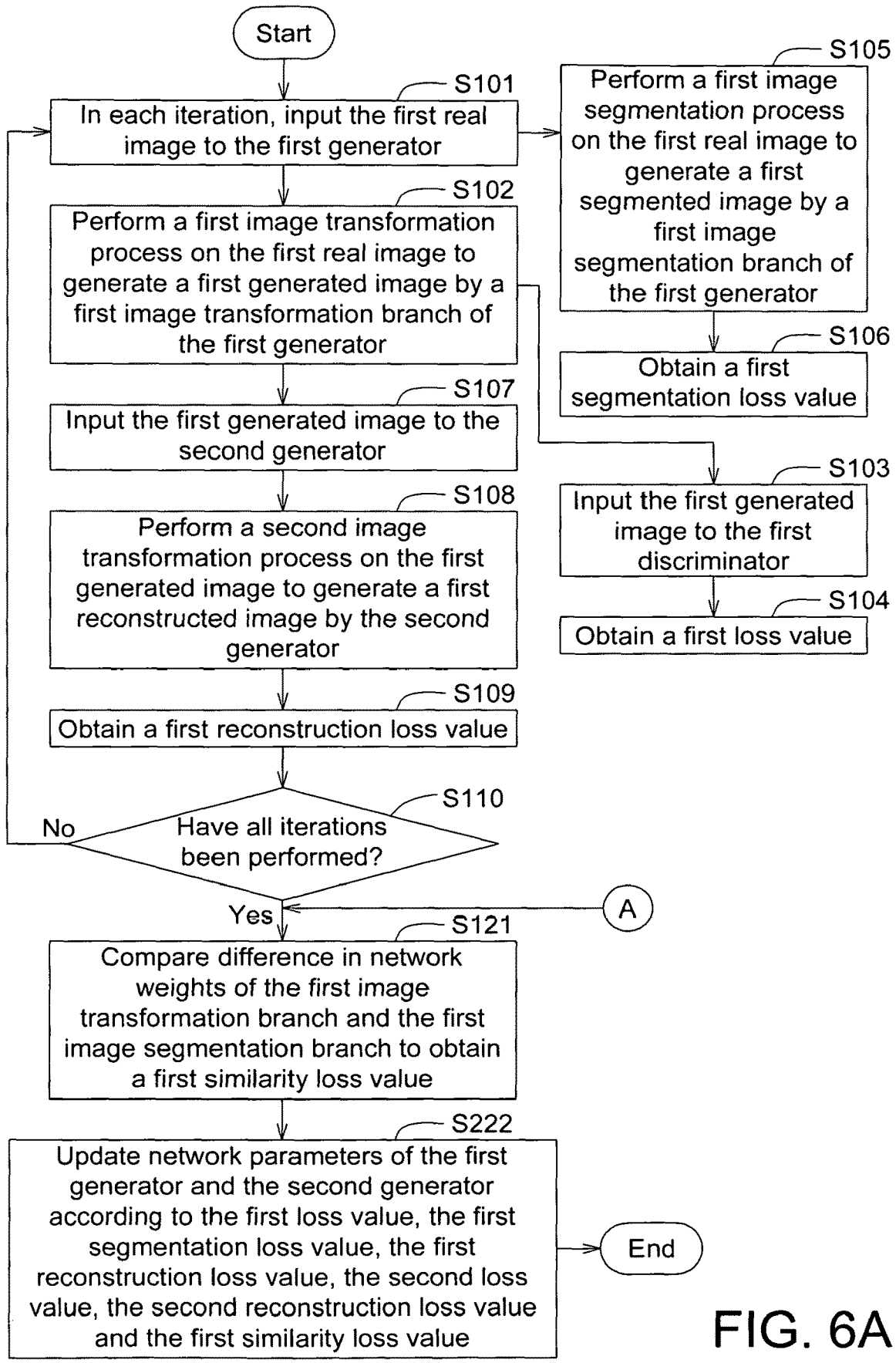
FIG. 6A and FIG. 6B are flow charts of a method for training an image generator according to another embodiment of the present disclosure.
Figure 6B:
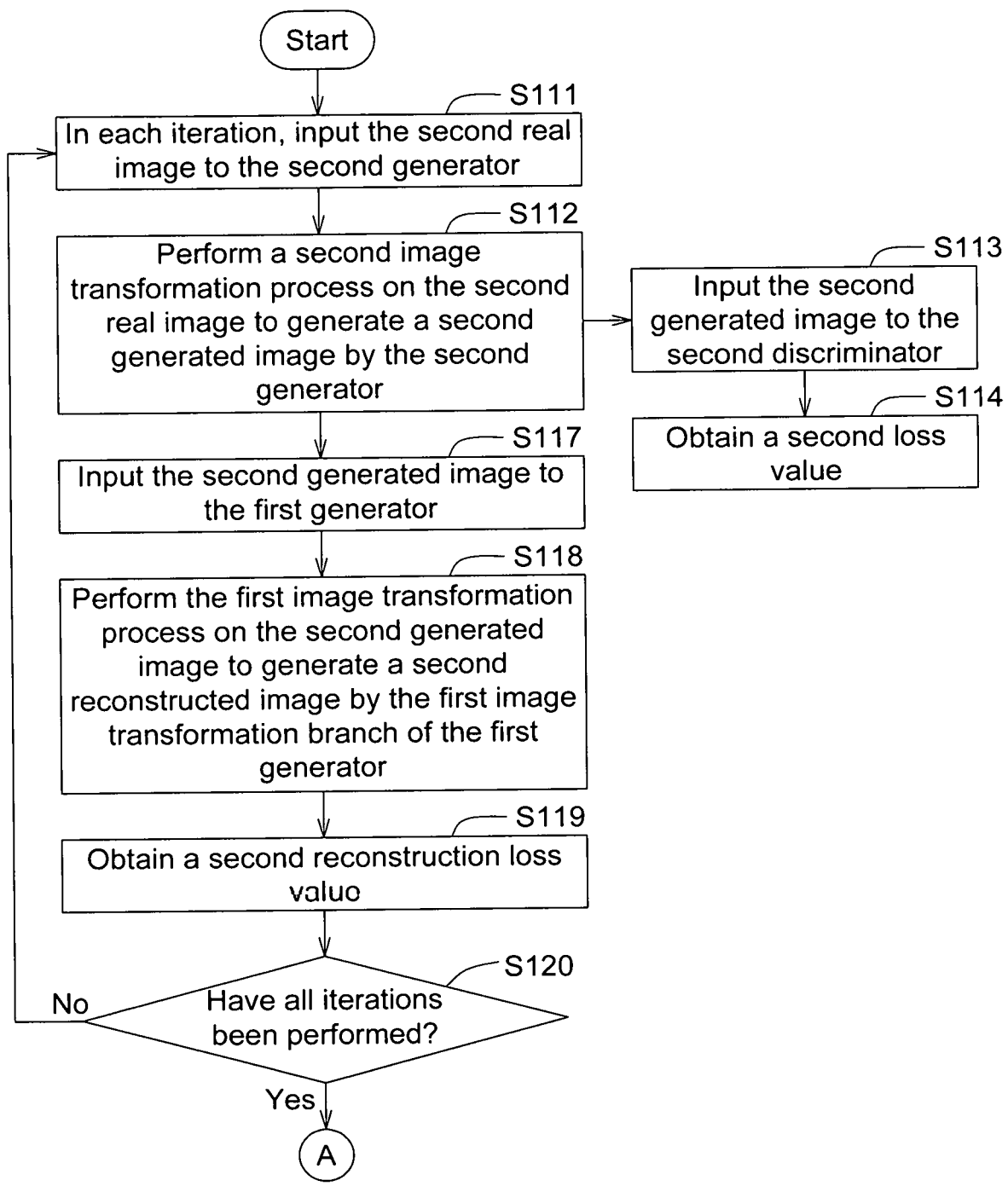

FIG. 6A and FIG. 6B are flow charts of a method for training an image generator according to another embodiment of the present disclosure. In the present embodiment, to ensure the ability of the second generator 120 to generate images, in addition to the training of the first generator 110 (as shown in steps S101-S110 of FIG. 6A), the training of the second generator 120 (as shown in steps S111-S114 and S117-S120 of FIG. 6B) is performed as well. After the training of the first generator 110 and the second generator 120 is completed, the first image transformation branch 111 of the first generator 110 may be used as an image generator.

The steps S101-S110 of FIG. 6A are the same as the steps S101-S110 of FIG. 3, and it is not repeated here again. The training method of the second generator 120 is further described below.

Figure 7A:
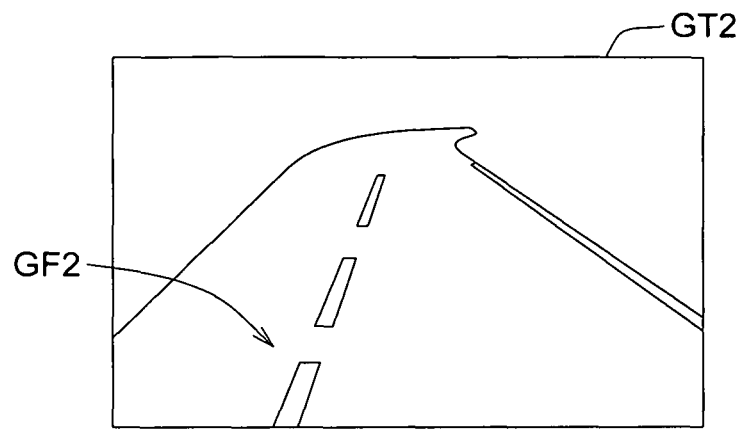
FIG. 7A is a schematic diagram of a second real image according to another embodiment of the present disclosure.
Figure 7B:
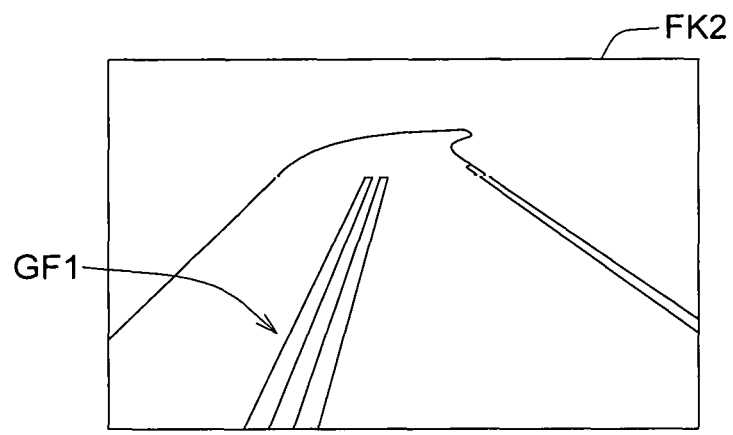
FIG. 7B is a schematic diagram of a second generated image according to another embodiment of the present disclosure.

FIG. 7A is a schematic diagram of a second real image GT2 according to another embodiment of the present disclosure. FIG. 7B is a schematic diagram of a second generated image FK2 according to another embodiment of the present disclosure.

Refer to FIG. 6B further with a reference to FIG. 1 and FIG. 7A. During the training of the second generator 120, multiple iterations are performed. The number of the iterations may depend on the memory size of the processor, and is not particularly limited herein. Steps S111-S114 and S117-S119 are repeated for each iteration until preset iterations are completed.

A second loss value (step S114) and a second reconstruction loss value (step S119) are obtained in each iteration.

As shown in step S111, in each iteration, the second real image GT2 is input to the second generator 120. The second real image GT2 has the second road surface feature GF2. Moreover, in different iterations, different second real images GT2 may be input, but these second real images GT2 all have the second road surface feature GF2. In the present embodiment, as shown in FIG. 7A, the single dashed yellow line is exemplified as the second road surface feature GF2.

Refer to FIG. 6B further with a reference to FIG. 1 and FIG. 7B. In step S112, a second image transformation process T2 is performed on the second t real image GT2 by the second image transformation branch 121 of the second generator 120 to generate a second generated image FK2 and transform the second road surface feature GF2 to the first road surface feature GF1. In the present embodiment, as shown in FIG. 7B, the double solid yellow line is exemplified as the first road surface feature GF1.

In step S113, the second generated image FK2 is input to the second discriminator 140. Afterwards, in step S114, a second loss value is obtained according to the second generated image FK2 from the second discriminator 140.

The way to obtain the second loss value is similar to that of the first loss value, and it is not repeated here again. Moreover, the training of the second discriminator 140 is also performed interactively during the multiple iterations of the training of the second generator 120. As shown in the lower portion of the discriminator training system 200 in FIG. 2, the second generated image FK2 and the first real image GT1 are input to the second discriminator 140. The second generated image FK2 and the first real image GT1 both have the first road surface feature GF1 (double solid yellow line); the difference is in that the second generated image FK2 is an image generated from the second generator 120, while the first real image GT1 is an image actually taken on the road. The training of the second discriminator 140 aims at determining whether there is a difference between the second generated image FK2 having the double solid yellow line and the first real image GT1 having a real double solid yellow line.

Refer to FIG. 6B further with a reference to FIG. 1 and FIG. 7B. In step S117, the second generated image FK2 is input to the first generator 110.

Then, in step S118, the first image transformation process T1 is performed on the second generated image FK2 by the first image transformation branch 111 of the first generator 110 to generate a second reconstructed image FK4 and transform the first road surface feature GF1 to the second road surface feature GF2.

Afterwards, in step S119, a second reconstruction loss value is obtained according to the second reconstructed image FK4 and the second real image GT2.

The way to obtain the second reconstruction loss value is similar to that of the first reconstruction loss value, and it is not repeated here again.

Next, it is determined if the preset iterations are completed, as shown in step S120. If not, steps S111-S114 and S117-S119 are repeated. If the preset iterations are completed, the process goes to node A.

Referring to FIG. 6A, node A follows the step S110. Next, step S121 is performed.

Similar to the step S121 of FIG. 3, difference in network weights of the first image transformation branch 111 and the first image segmentation branch 112 is compared to obtain a first similarity loss value, and it is not repeated here again.

Afterwards, step S222 is performed. In step S222, network parameters of the first generator 110 and the second generator 120 are updated according to the first loss values (step S104), the first segmentation loss values (step S106), the first reconstruction loss values (step S109), the second loss values (step S144), the second reconstruction loss values (step S119) and the first similarity loss values (step S121) obtained in all of the iterations, and then the training of the image generator is completed for one time. In other embodiments, the steps as shown in FIG. 6A and FIG. 6B may be performed for many times (for example, thousands or tens of thousand times) to finish the training of the image generator. Thus, the first image transformation branch 111 of the first generator 110 may be used as an image generator. The first image transformation branch 111 is adapted to generate another training image having the second road surface feature GF2 from an initial training image having the first road surface feature GF1. Moreover, the positions of the target labels in the two training images before and after the transformation correspond to each other.

Referring to FIG. 1, in still another embodiment, the generator training system 100 includes the training system of the first generator 110 and the training system of the second generator 120. The second generator 120 further includes a second image segmentation branch 122.

Figure 8A:
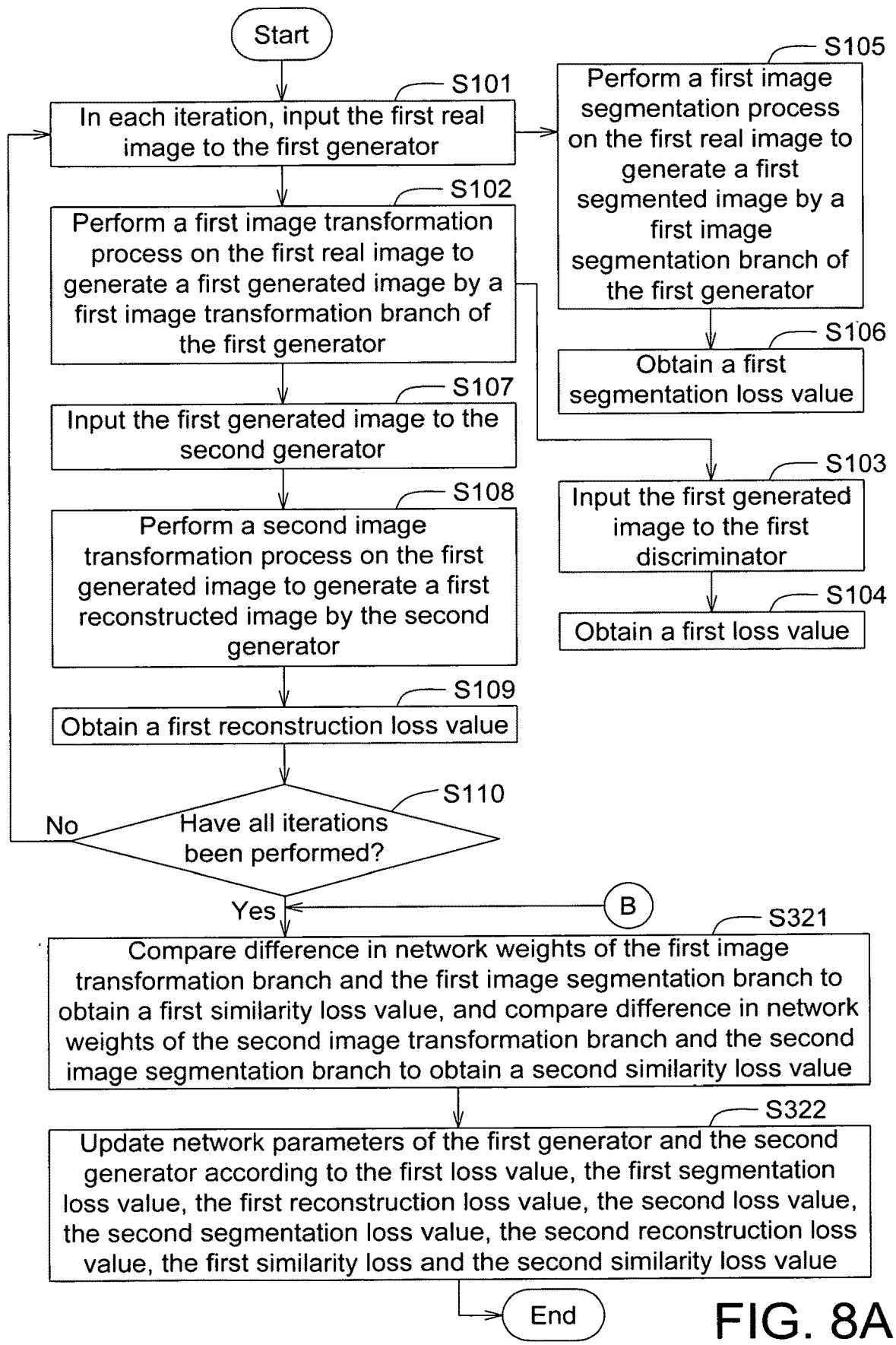
FIG. 8A and FIG. 8B are flow charts of a method for training an image generator according to still another embodiment of the present disclosure.
Figure 8B:
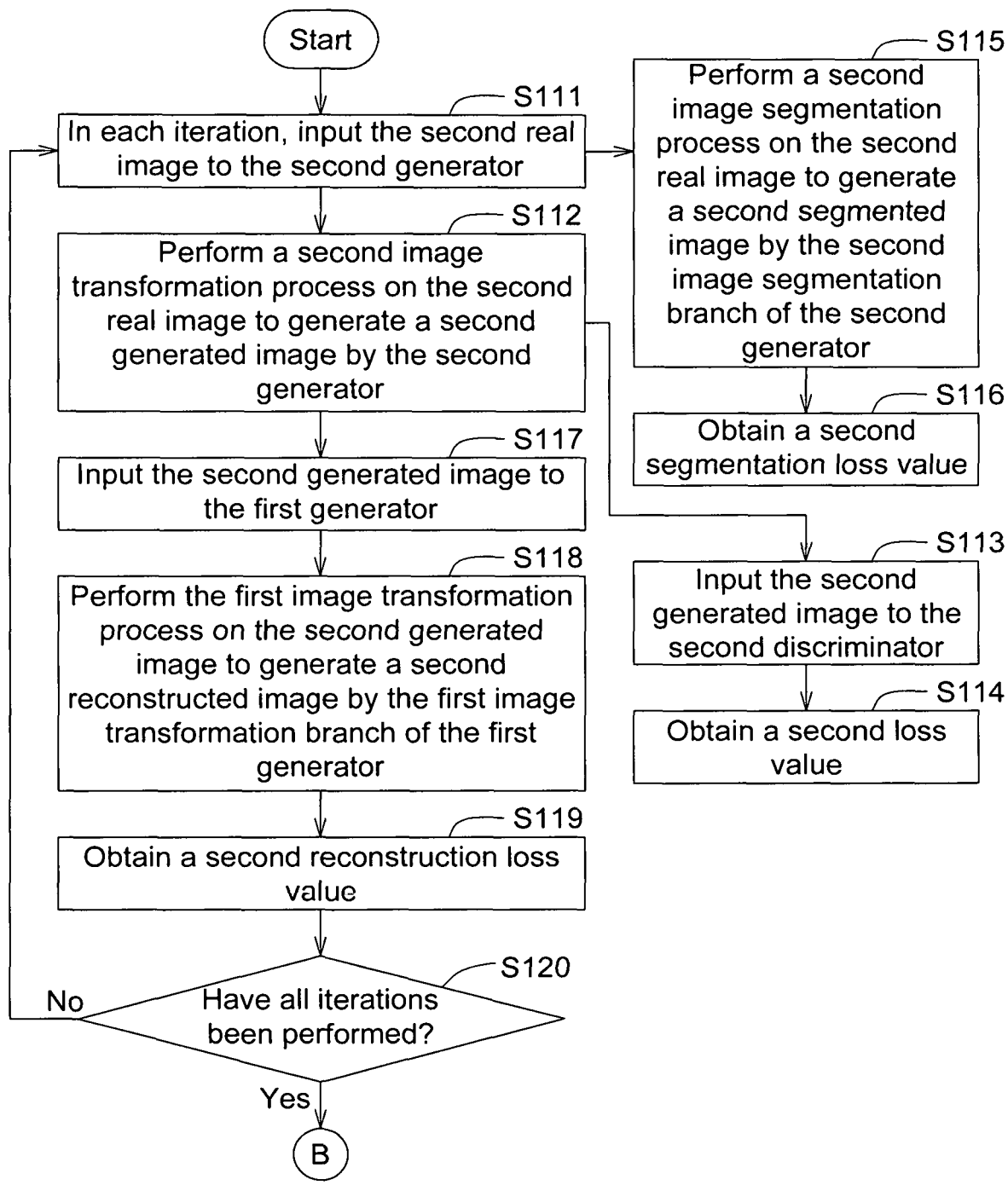

FIG. 8A and FIG. 8B are flow charts of a method for training an image generator according to still another embodiment of the present disclosure. In the present embodiment, in addition to the training of the first generator 110 (as shown in steps S101-S110 of FIG. 8A), the training of the second generator 120 (as shown in steps S111-S120 of FIG. 8B) is performed as well. After the training of the first generator 110 and the second generator 120 is completed, not only the first image transformation branch 111 of the first generator 110 may be used as an image generator, but also the second image transformation branch 121 of the second generator 120 may be used as another image generator as well.

The steps S101-S110 of FIG. 8A are the same as the steps S101-S110 of FIG. 3, the steps S111-S114 and S117-S119 of FIG. 8B are the same as the steps S1111-S114 and S117-S119 of FIG. 6B, and it is not repeated here again.

Figure 9:
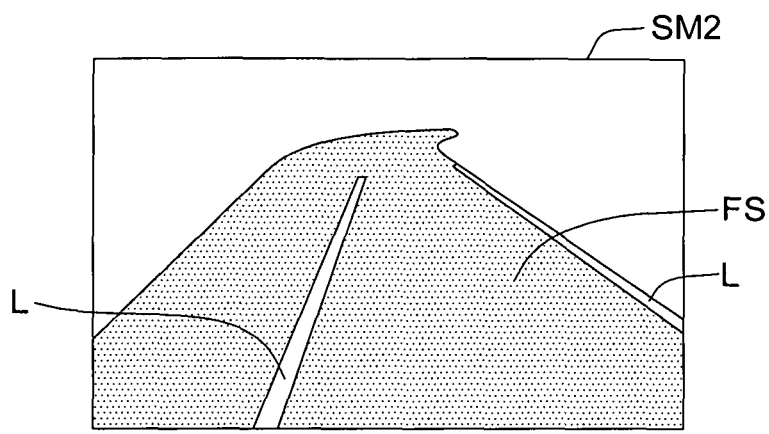
FIG. 9 is a schematic diagram of a second segmented image according to still another embodiment of the present disclosure.
Figure 10A:
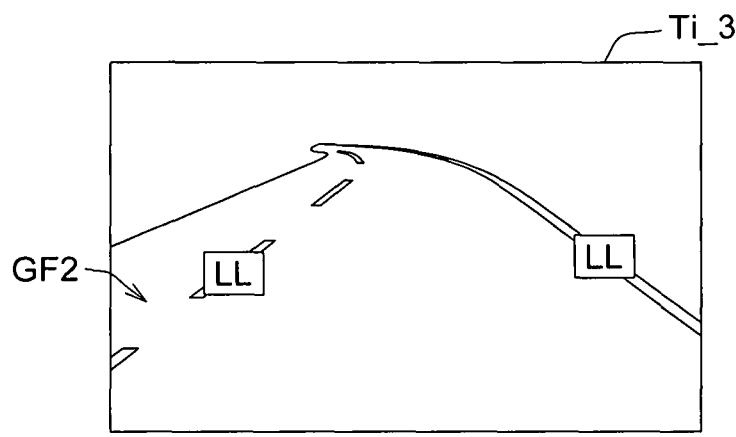
FIG. 10A and FIG. 10B are respectively a schematic diagram of an initial training image and a schematic diagram of a generated training image according to still another embodiment of the present disclosure.
Figure 10B:
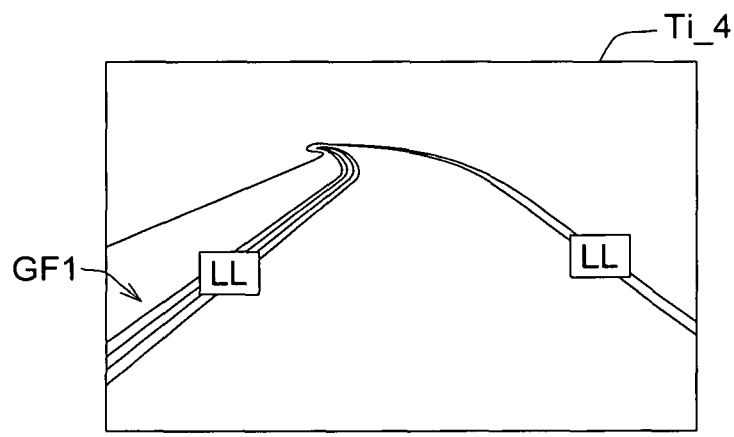

FIG. 9 is a schematic diagram of a second segmented image SM2 according to still another embodiment of the present disclosure.

Refer to FIG. 8B further with a reference to FIG. 1 and FIG. 9. The training of the second generator 120 further includes step S115 and step S116.

In step S115, a second image segmentation process S2 is performed on the second real image GT2 by the second image segmentation branch 122 of the second generator 120 to generate a second segmented image SM2.

Afterwards, in step S116, a second segmentation loss value is obtained according to the second segmented image SM2.

The way to obtain the second segmentation loss value is similar to that of the first segmentation loss value, and it is not repeated here again. As shown in FIG. 9, assuming that the second image segmentation branch 122 is an ideal model, after the second image segmentation process S2, the second segmented image SM2 may be divided into the line marking L and the drivable area FS.

Referring to FIG. 8B, if all iterations have been performed, the process goes to node B.

Referring to FIG. 8A, node B follows the step S110. Next, step S321 is performed.

In step S321, difference in network weights of the first image transformation branch 111 and the first image segmentation branch 112 is compared to obtain a first similarity loss value. Moreover, difference in network weights of the second image transformation branch 121 and the second image segmentation branch 122 is compared to obtain a second similarity loss value.

The way to obtain the second similarity loss value is similar to that of the first similarity loss value, and it is not repeated here again.

Next, in step D322, network parameters of the first generator 110 and the second generator 120 are updated according to the first loss values (step S104), the first segmentation loss values (step S106), the first reconstruction loss values (step S109), the second loss values (step S144), the second segmentation loss values (step S116), the second reconstruction loss values (step S119), the first similarity loss values (step S321) and the second similarity loss values (step S321) obtained in all of the iterations, and then the training of the image generator is completed for one time. In other embodiments, the steps as shown in FIG. 8A and FIG. 8B may be performed for many times (for example, thousands or tens of thousand times) to complete the training of the image generator. Thus, the first image transformation branch 111 of the first generator 110 may be used as an image generator, and the second image transformation branch 121 of the second generator 120 may also be used as another image generator. The first image transformation branch 111 is adapted to generate another training image having the second road surface feature GF2 from an initial training image having the first road surface feature GF1; the positions of the target labels in the two training images before and after the transformation correspond to each other. Moreover, the second image transformation branch 121 is adapted to generate another training image having the first road surface feature GF1 from an initial training image having the second road surface feature GF2; the positions of the target labels in the two training images before and after the transformation correspond to each other.

For example, referring to FIG. 5A, FIG. 5B, FIG. 10A and FIG. 10B, after the training of the first generator 110 and the second generator 120 as recited above, an initial training image Ti_1 (FIG. 5A) may be input to the first generator 110. The initial training image Ti_1 has target labels (e.g., labels of the line marking LL) and the first road surface feature GF1 (e.g., double solid yellow line). The first image transformation branch 111 of the first generator 110 may transform the first road surface feature GF1 of the initial training image Ti_1 to the second road surface feature GF2 (e.g. single dashed yellow line) and generate a generated training image Ti_2.

On the other hand, an initial training image Ti_3 (FIG. 10A) may also be input to the second generator 120. The initial training image Ti_3 has target labels (e.g., labels of the line marking LL) and the second road surface feature GF2 (e.g., single dashed yellow line). The second image transformation branch 121 of the second generator 120 may transform the second road surface feature GF2 of the initial training image Ti_3 to the first road surface feature GF1 (e.g. double solid yellow line) and generate a generated training image Ti_4.

Since, for the trained first generator 110 and the trained second generator 120, the network weights of the first image transformation branch 111 and the first image segmentation branch 112 of the first generator 110 are similar enough, and the network weights of the second image transformation branch 121 and the second image segmentation branch 122 of the second generator 120 are similar enough, the first image transformation branch 111 and the second image transformation branch 121 may be affected respectively by the first image segmentation branch 112 and the second image segmentation branch 122 during the first image transformation process T1 to the initial training image Ti_1 and the second image transformation process T2 to the initial training image Ti_3. Thus, the positions of the labels of line marking LL in the generated training images Ti_2, Ti_4 may correspond to those in the initial training images Ti_1, Ti_3, and the positions of labels of line marking LL may be unchanged before and after the image transformation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for training an image generator used to augment images having target labels, the method comprising:
    performing a plurality of first iterations, in each of the first iterations performing the following steps:
    inputting a first real image having a first road surface feature to a first generator;
    performing, by a first image transformation branch of the first generator, a first image transformation process on the first real image to generate a first generated image and transform the first road surface feature to a second road surface feature;
    inputting the first generated image to a first discriminator;
    obtaining, from the first discriminator, a first loss value according to the first generated image;
    performing, by a first image segmentation branch of the first generator, a first image segmentation process on the first real image to generate a first segmented image;
    obtaining a first segmentation loss value according to the first segmented image;
    inputting the first generated image to a second generator;
    performing, by the second generator, a second image transformation process on the first generated image to generate a first reconstructed image and transform the second road surface feature to the first road surface feature; and
    obtaining a first reconstruction loss value according to the first reconstructed image and the first real image;
    comparing difference in network weights of the first image transformation branch and the first image segmentation branch to obtain a first similarity loss value; and
    updating network parameters of the first generator and the second generator according to the first loss value, the first segmentation loss value, the first reconstruction loss value and the first similarity loss value obtained in each of the first iterations to complete the training of the image generator.

2. The method according to claim 1, wherein in the step of obtaining the first similarity loss value, the first similarity loss value is formulated as:
$\mathcal{L}_{\omega-sharing}(\omega_{x,t}, \omega_{x,s}) = -\log(\omega_{x,t} \cdot \omega_{x,s}/\|\omega_{x,t}\|_2 \|\omega_{x,s}\|_2)$,
wherein $\omega_{x,t}$ is a network weight vector of the first image transformation branch, and $\omega_{x,s}$ is a network weight vector of the first image segmentation branch.

3. The method according to claim 1, wherein:
in each of the first iterations further performs the following steps:
inputting the first generated image and a second real image to the first discriminator to train the first discriminator, the second real image having the second road surface feature; and
the step of obtaining the first loss value according to the first generated image from the first discriminator comprises: comparing, by the first discriminator, difference between the first generated image and the second real image to obtain the first loss value.

4. The method according to claim 1, further comprising:
performing a plurality of second iterations, in each of the second iterations performing the following steps:
inputting a second real image having the second road surface feature to the second generator;
performing, by the second generator, a second image transformation process on the second real image to generate a second generated image and transform the second road surface feature to the first road surface feature;
inputting the second generated image to a second discriminator;
obtaining, from the second discriminator, a second loss value according to the second generated image;
inputting the second generated image to the first generator;
performing, by the first image transformation branch of the first generator, the first image transformation process on the second generated image to generate a second reconstructed image and transform the first road surface feature to the second road surface feature; and obtaining a second reconstruction loss value according to the second reconstructed image and the second real image;

wherein the training method further comprises updating the network parameters of the first generator and the second generator according to the second loss value and the second reconstruction loss value obtained in each of the second iterations.

5. The method according to claim 4, wherein:

in each of the first iterations further performs the following steps:

inputting the first generated image and the second real image to the first discriminator to train the first discriminator;

the step of obtaining the first loss value according to the first generated image from the first discriminator comprises: comparing, by the first discriminator, difference between the first generated image and the second real image to obtain the first loss value; and in each of the second iterations further performs the following steps:

inputting the second generated image and the first real image to the second discriminator to train the second discriminator;

the step of obtaining the second loss value according to the second generated image from the second discriminator comprises: comparing, by the second discriminator, difference between the second generated image and the first real image to generate the second loss value.

6. The method according to claim 1, further comprising:

performing a plurality of second iterations, in each of the second iterations performing the following steps:

inputting a second real image having the second road surface feature to the second generator;

performing, by a second image transformation branch of the second generator, a second image transformation process on the second real image to generate a second generated image and transform the second road surface feature to the first road surface feature;

inputting the second generated image to a second discriminator;

obtaining, from the second discriminator, a second loss value according to the second generated image;

performing, by a second image segmentation branch of the second generator, a second image segmentation process on the second real image to generate a second segmented image;

obtaining a second segmentation loss value according to the second segmented image;

inputting the second generated image to the first generator;

performing, by the first image transformation branch of the first generator, the first image transformation process on the second generated image to generate a second reconstructed image and transform the first road surface feature to the second road surface feature; and obtaining a second reconstruction loss value according to the second reconstructed image and the second real image; and comparing difference of weights between the second image transformation branch and the second image segmentation branch to generate a second similarity loss value;

wherein the training method further comprises updating the network parameters of the first generator and the second generator according to the second loss value, the second segmentation loss value, the second reconstruction loss value and the second similarity loss value generated in each of the second iterations to finish the training method of the image generator.

7. The method according to claim 6, wherein:

in each of the first iterations further performs the following steps:

inputting the first generated image and the second real image to the first discriminator to train the first discriminator;

the step of obtaining the first loss value according to the first generated image from the first discriminator comprises: comparing, by the first discriminator, difference between the first generated image and the second real image to obtain the first loss value; and in each of the second iterations further performs the following steps:

inputting the second generated image and the first real image to the second discriminator to train the second discriminator; and the step of obtaining the second loss value according to the second generated image from the second discriminator comprises: comparing, by the second discriminator, difference between the second generated image and the first real image to obtain the second loss value.

8. The method according to claim 1, wherein the first road surface feature and the second road surface feature are different from each other in types of pavement materials, or are road surfaces each having different features under different weather or time-of-day, or a combination thereof.

9. The method according to claim 1, wherein the first road surface feature and the second road surface feature are different from each other in types of line markings.

10. The method according to claim 1, wherein the first road surface feature and the second road surface feature are different from each other in types of lane lines.

* * * * *